United States Patent
Schank et al.

(10) Patent No.: US 9,175,673 B2
(45) Date of Patent: Nov. 3, 2015

(54) ELASTOMERIC SIGNAL TRANSMISSION AND MOTION AMPLIFICATION

(75) Inventors: Troy C. Schank, Keller, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 516 days.

(21) Appl. No.: 13/699,838

(22) PCT Filed: Jun. 13, 2011

(86) PCT No.: PCT/US2011/040159
§ 371 (c)(1),
(2), (4) Date: Nov. 26, 2012

(87) PCT Pub. No.: WO2012/173593
PCT Pub. Date: Dec. 20, 2012

(65) Prior Publication Data
US 2013/0216399 A1    Aug. 22, 2013

(51) Int. Cl.
| | | |
|---|---|---|
| *B64C 11/38* | (2006.01) | |
| *F04B 7/00* | (2006.01) | |
| *F15B 15/14* | (2006.01) | |
| *F15B 15/08* | (2006.01) | |
| *B64C 27/615* | (2006.01) | |
| *B64C 13/40* | (2006.01) | |
| *B64C 27/72* | (2006.01) | |

(52) U.S. Cl.
CPC . *F04B 7/00* (2013.01); *B64C 11/38* (2013.01); *B64C 13/40* (2013.01); *B64C 27/615* (2013.01); *F15B 15/088* (2013.01); *F15B 15/14* (2013.01); *B64C 2027/7272* (2013.01); *Y02T 50/34* (2013.01)

(58) Field of Classification Search
CPC .. B64C 3/50; B64C 13/40; B64C 2027/7272; B64C 2027/7283; F15D 15/008; F15D 15/14; F05D 2240/303
USPC .......................................................... 416/24
See application file for complete search history.

(56) References Cited

U.S. PATENT DOCUMENTS

| | | | |
|---|---|---|---|
| 3,509,714 A | | 5/1970 | Walton |
| 4,598,181 A | * | 7/1986 | Selby ............................. 200/5 A |
| 5,152,392 A | * | 10/1992 | Iwasa ............................. 200/517 |
| 5,158,005 A | * | 10/1992 | Negishi et al. ..................... 92/92 |

(Continued)

FOREIGN PATENT DOCUMENTS

EP    0734947    10/1996

OTHER PUBLICATIONS

European Search Report dated Nov. 29, 2013 from counterpart EP App. No. 11867613.9.

(Continued)

*Primary Examiner* — Ninh H Nguyen
(74) *Attorney, Agent, or Firm* — James E. Walton

(57) ABSTRACT

A system and method to amplify displacement includes a housing forming a cylindrical chamber having an elastomeric material disposed therein. The chamber being sealed with a first membrane and a second membrane. The first membrane being attached to a first end having and the second membrane being attached to a second end, the first end having a greater diameter than the second end. The method including producing an input displacement with a driver attached to the first membrane, which in turn results in an amplified output displacement at the second end.

10 Claims, 4 Drawing Sheets

(56) References Cited

U.S. PATENT DOCUMENTS

| | | | |
|---|---|---|---|
| 5,461,207 A * | 10/1995 | Van Lear | 200/81 H |
| 6,109,870 A | 8/2000 | Yamakawa et al. | |
| 6,394,397 B1 | 5/2002 | Ngo et al. | |
| 2003/0215332 A1 | 11/2003 | Torok et al. | |
| 2007/0114881 A1 | 5/2007 | Jensen et al. | |

OTHER PUBLICATIONS

International Search Report and the Written Opinion of the International Searching Authority mailed by ISA/USA, U.S. Patent and Trademark Office on Oct. 25, 2011 for International Patent Application No. PCT/US2011/040159, 9 pages.

(Arouette et al) Dynamic Characteristics of a Hydraulic Amplification Mechanism for Large Displacement Actuators Systems. Mar. 29, 2010. vol. 10, pp. 2948-2956, retrieved from the internet: <URL:www.mdpi.com/journal/sensors.

OFfice Action dated Nov. 21, 2014 from counterpart CA App. No. 2,836,242.

* cited by examiner

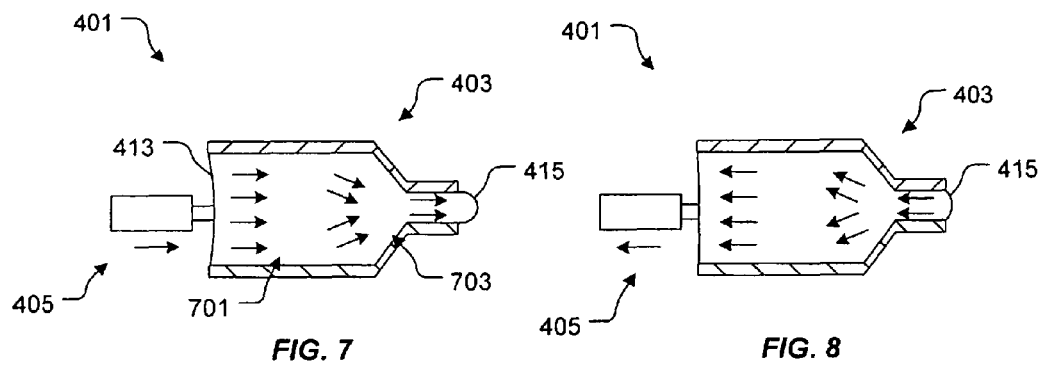
FIG. 7
FIG. 8
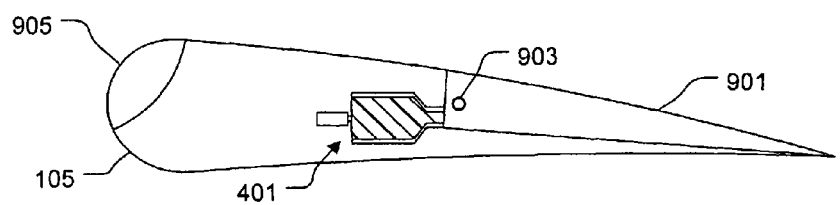
FIG. 9
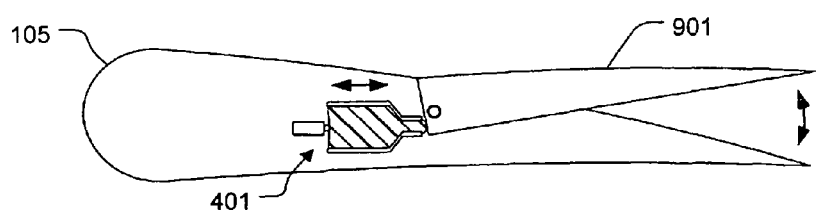
FIG. 10

ELASTOMERIC SIGNAL TRANSMISSION AND MOTION AMPLIFICATION

TECHNICAL FIELD

The present application relates generally to displacement amplifiers, and more specifically, to an elastomeric displacement amplifier.

DESCRIPTION OF THE PRIOR ART

Conventional displacement amplifiers are well known in the art for amplifying movement. The amplifiers are typically operably associated with mechanical and/or hydraulic systems. In the aircraft industry, amplifiers can be utilized with flaps, leading edge droops, and other active devices associated with airfoils.

Common problems associated with conventional amplifiers include: mechanical system efficiencies created limited amplification ratios; and, hydraulic amplifiers are prone to leaking. In one embodiment, a hydraulic leak in a rotor blade could create rotor imbalance, resulting in the rotor blade failing, and more seriously, causing the aircraft to crash.

Although the foregoing developments represent great strides in the area of displacement amplifiers, many shortcomings remain.

BRIEF DESCRIPTION OF THE DRAWINGS

The novel features believed characteristic of the application are set forth in the appended claims. However, the invention itself, as well as a preferred mode of use, and further objectives and advantages thereof, will best be understood with reference to the following detailed description when read in conjunction with the accompanying drawings, wherein:

FIGS. 7 and 8 are cross-sectional views of the displacement amplifier of FIG. 4 depicting the flow of elastomeric material;

FIGS. 9 and 10 are cross-sectional views of a rotor blade of the rotary aircraft of FIG. 1;

Figure 1:
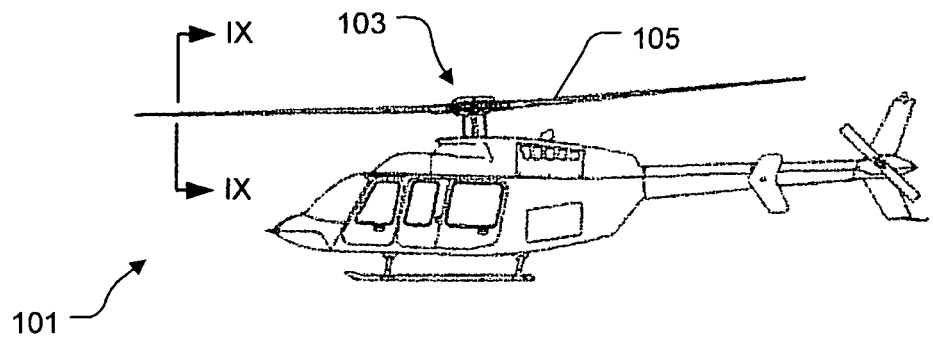
FIG. 1 is a side view of a rotary aircraft.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The system and method of the present application overcomes the abovementioned problems commonly associated with conventional displacement amplifiers. Specifically, the system comprises a displacement amplifier having an elastomeric material disposed therein and adapted to provide amplification of an input displacement. The elastomeric material provides significant advantages, including, the elastomeric material does not leak, a problem commonly associated with conventional fluid systems. In addition, the properties of the elastomeric material can be tailored to provide a desired resonant frequency, which in turn reduces the required input force from a driver subsystem creating the input displacement. Further description and illustration of the present system is provided in the figures and disclosure below.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, FIG. 1 shows a rotary aircraft 101 utilizing the displacement amplification system of the present application. In the exemplary embodiment, aircraft 101 is a helicopter comprising a rotary system 103 operably associated with two or more rotor blades 105 coupled thereto. The present system is preferably operably associated with blade 105, for example, the system amplifies displacement of a driver adapted to control a trialing edge flap, a leading edge droop, and/or other active devices associated with blade 105. However, it will be appreciated that the present system can easily be adapted for use with other devices operably associated with aircraft 101. In addition, in the preferred embodiment the present system is operably associated with a rotary aircraft; however, it should be appreciated that the system could easily be adapted for use with other types of aircraft, including fixed and tilt-wing aircraft, and other types of vehicles, i.e., a land based vehicle, in lieu of the preferred embodiment.

It should be understood that some of the required systems and devices operably associated with the present system are not shown, i.e., mounting devices for supporting the system, thus providing quick and easy depiction and disclosure of the novel features of the present system. However, it should be understood that the different embodiments of the system disclosed herein utilizes these required systems and devices for operation, as conventionally known in the art, although not shown in the drawings.

Figure 2:
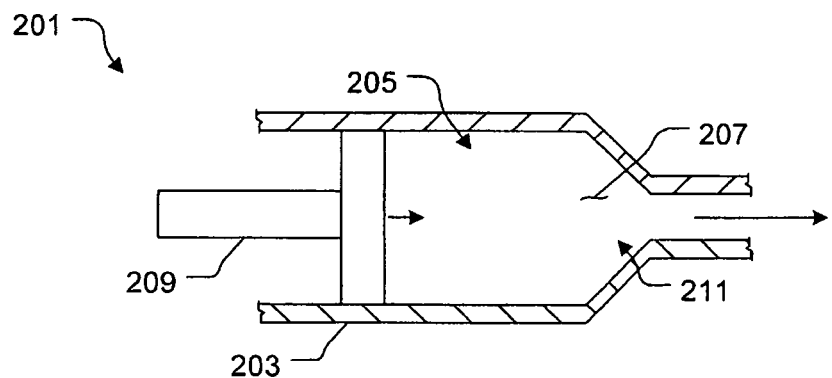
FIG. 2 is a cross-sectional view of a conventional displacement amplifier.
Figure 3:
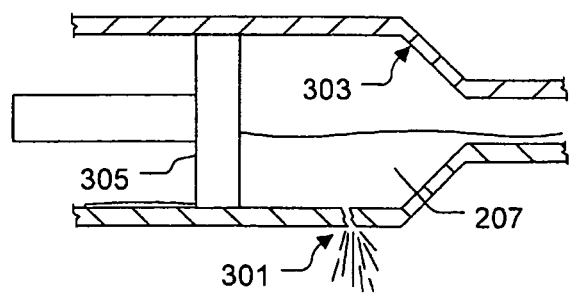
FIG. 3 is a cross-sectional view of a damaged displacement amplifier.

Referring to FIGS. 2 and 3 in the drawings, cross-sectional views of a conventional displacement amplifier 201 are shown. FIG. 2 shows amplifier 201 during normal operation, wherein the input displacement from a driver is amplified. FIG. 3 shows amplifier 201 after being damaged. Amplifier 201 comprises a housing 203 forming a fluidly sealed chamber 205 for receiving a hydraulic fluid 207 therein. During operation, a driver 209, i.e., a hydraulic piston, is utilized to direct hydraulic fluid 207 through chamber 205, which in turn provides a driving force for operating an active element (not shown). Housing 203 has an inner surface contoured to amplify the displacement of driver 209.

Amplifier 201 is inevitably damaged over time, which could cause hydraulic fluid 207 to leak from chamber 205. FIG. 3 depicts amplifier 201 being damaged with a crack 301 extending through housing 203 and a worn fluid seal (not shown) around the piston head 305, which creates fluid passage for fluid to seep therethrough. In some applications, i.e., rotor blade usage, the leaking fluid could create imbalances, which could result in the aircraft crashing.

Figure 4:
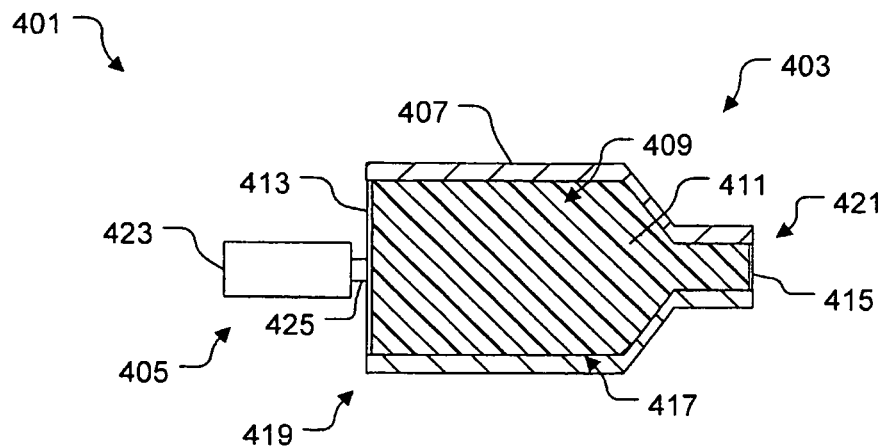
FIGS. 4 and 5 are cross-sectional views of a displacement amplifier according to the preferred embodiment of the present application.
Figure 5:
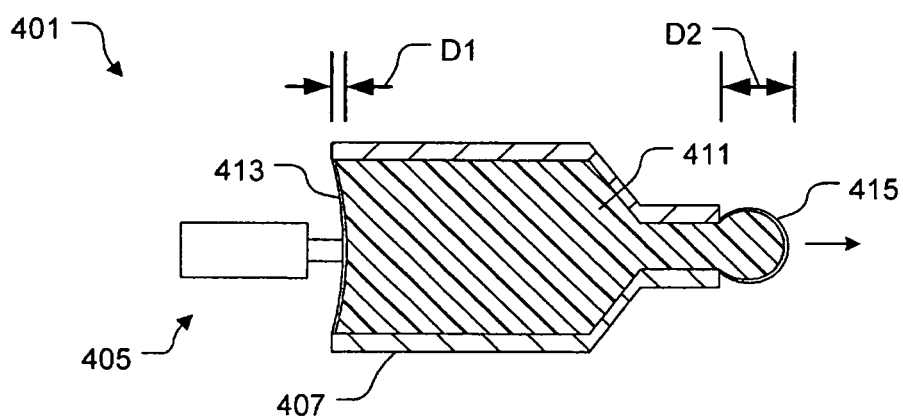
Figure 6:
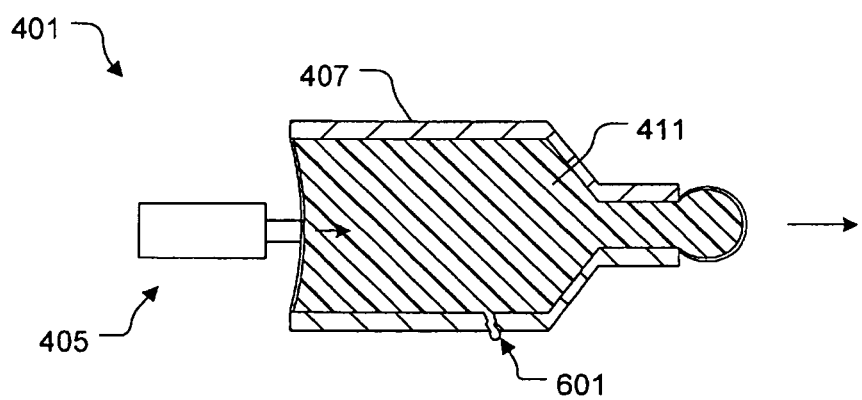
FIG. 6 is a cross-sectional view of a damaged displacement amplifier.

Referring now to FIGS. 4-6 in the drawings, cross-sectional views of a system 401 according to the preferred embodiment of the present application are shown. System 401 overcomes the disadvantages commonly associated with conventional amplifiers, namely, system 401 does not leak and is adapted to reduce the required force input from a drive subsystem. System 401 comprises a displacement amplifier 403 and a drive subsystem 405. In FIG. 4, system 401 is shown in a static position prior to operation; FIG. 5 shows system 401 during operation; and, FIG. 6 shows system 401 after being damaged, yet remaining operable.

Displacement amplifier 403 is utilized to amplify the displacement created by drive subsystem 405. Displacement amplifier 403 comprises a housing 407 forming a chamber 409 for receiving an elastomeric material 411 therein. In the preferred embodiment, elastomeric material 411 fills the entire volume of chamber 409. Housing 407 is further provided with a first membrane 413 and a second membrane 415 attach to an inner surface 417 of chamber 409 at respective ends 419 and 421 of housing 407. Chamber 409, membrane 413, and membrane 415 form a fluidly sealed area for containing elastomeric material 411 therein. In the preferred embodiment, housing 407 is manufactured in a cylindrical shape; however, it should be appreciated that alternative embodiments could include other geometric shapes in lieu of the preferred embodiment. Also, in the preferred embodiment, end 419 has a greater diameter length than the diameter length of end 421. This feature enables amplification of the displacement as elastomeric material 411 flows from end 419 to end 421.

Drive subsystem 405 is utilized to provide an input displacement, which in turn is amplified in chamber 409. Drive subsystem 405 is operably associated with a control subsystem (not shown), which provides input to drive subsystem 405 to manipulate one or more active elements operably associated with system 401. Drive subsystem 405 comprises a driver 423 coupled to membrane 413 via a retractable shaft 425. In the preferred embodiment, driver 423 is a piezoelectric actuator, which has a small stroke displacement and a relatively large force output. However, it should be appreciated that alternative embodiments could include different driving devices in lieu of the preferred embodiment.

Referring specifically to FIG. 5, driver 423 is shown exerting a force against membrane 413. The force of driver 423 produces an input displacement D1, which is amplified to create an output displacement D2. As is shown, displacement amplifier 403 is an effective means for amplifying an input displacement. It should be appreciated that elastomeric material 411 can be tailored to provide different outputs. For example, a 10 millimeter input displacement from driver 423 could result in a 50 millimeter or a 100 millimeter displacement output, depending on the elastic properties of elastomeric material 411.

System 401 is prone to wear and eventually will become damaged over time due to normal wear, and in some applications, due to foreign objects, i.e., a bullet, penetrating through housing 407. FIG. 6 shows displacement amplifier 403 being damaged with a crack 601 extending through housing 407. The crack extends through the entire thickness of housing 407 and leaves chamber 409 exposed. It will be appreciated that system 401 remains operably despite having one or more cracks 601 due to elastomeric material 411 being tailored with sufficient elasticity to prevent leaking from chamber 409.

In the preferred embodiment, elastomeric material 411 is composed of a low viscosity rubber having a high bulk modulus. This feature enables elastomeric material 411 to move within chamber 409, yet prevents the material from leaking through crack 601. Elastomeric material 411 is also incompressible, thus providing some similar force responses as hydraulic fluid. Furthermore, the mechanical properties of elastomeric material 411 can be tailored, as discussed below, to change the resonant frequency, which in turn reduces the amount of input force required by driver 423.

Referring to FIGS. 7 and 8 in the drawing, flow diagrams of elastomeric material 411 are shown. In FIG. 7, drive subsystem 405 pushes against membrane 413; this in turn results in membrane 415 expanding. The small displacement created by drive subsystem 405 in region 701 of chamber 409 results in a larger displacement in elastomeric material 411 in region 703 of chamber 409. In FIG. 8, drive subsystem 405 pulls against membrane 413; this in turn results in membrane 415 contracting.

Referring to FIGS. 9 and 10 in the drawings, cross-sectional views of rotor blade 105 taken at IX-IX of FIG. 1 are shown. In FIG. 9, system 401 is shown operably associated with a working element 901. In the exemplary embodiment, working element 901 is a flap associated with rotor blade 105; however, it should be appreciated that in alternative embodiments, system 401 could be operably associated with other types of working elements, i.e., leading edge droops or cuffs 905, in lieu of the exemplary embodiment. During operation, system 401 creates a displacement, which in turn pivots element 901 about a pivot 903.

Figure 11:
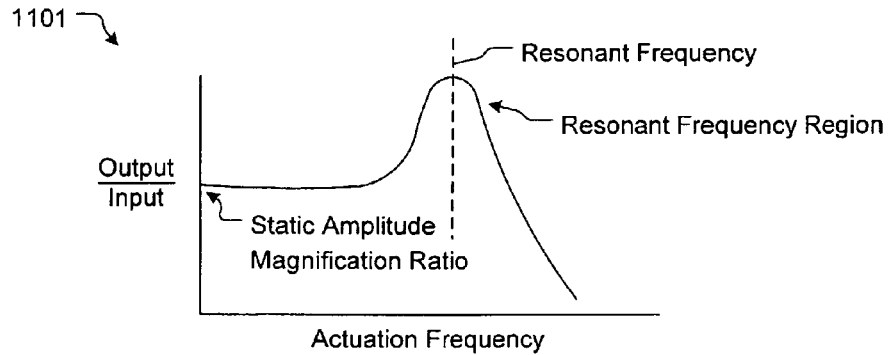
FIG. 11 is a graph depicting the displacement output for a given input as a function of actuation frequency.

Referring to FIG. 11 in the drawings, a graph 1101 depicting output of displacement amplifier 403 is shown for a given input as a function of actuation frequency. It should be understood that at static or low frequency conditions, the output is amplified by the ratio of the input and output areas. At the tuned natural frequency condition however, the output grows larger than the simple area ratio due to the resonance operation. This allows larger amplification than is statically possible, or allows a decrease in the input amplitude (lower power) for a given output.

Graph 1101 depicts a resonant frequency region, which is the ideal region for operation. When operating system 401 within this region, the output exceeds the static magnification ratio. Thus, the input power for a given output can be reduced or the output at maximum input amplitude can be greater than the static magnification ratio. It will be appreciated that the material properties of the elastomeric material 411 can be tailored to create a desired resonant frequency, thereby reducing the input power or the output at maximum input amplitude. Such features are not possible with conventional fluid displacement amplifiers.

Figure 12:
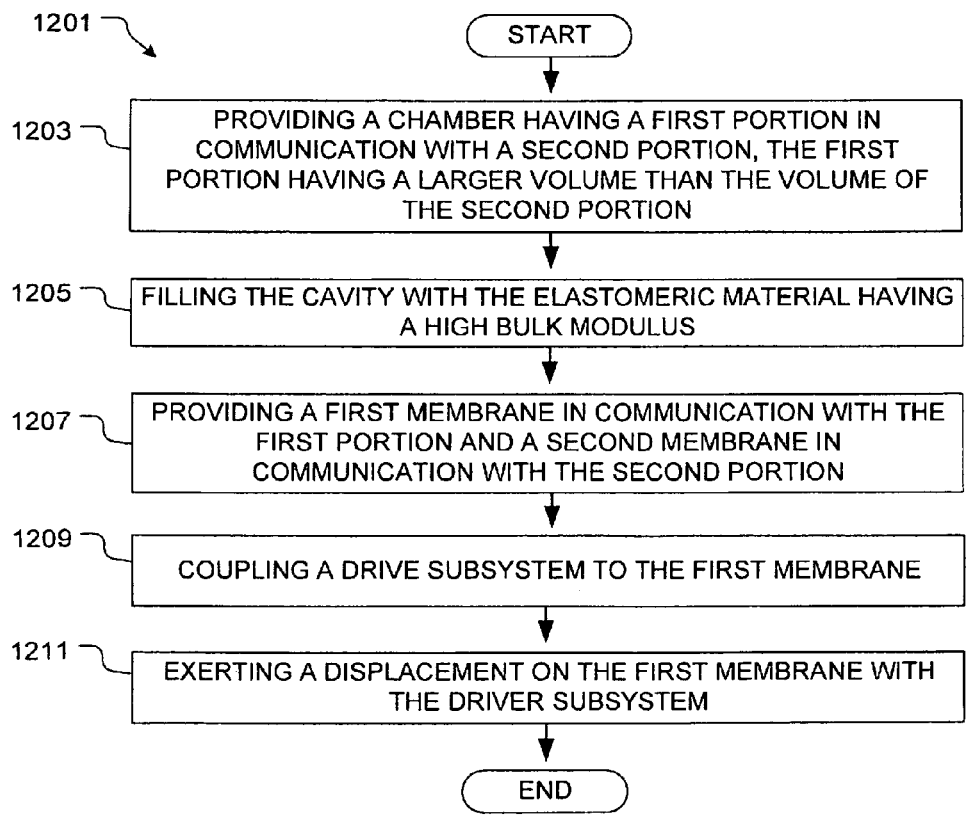
FIG. 12 is a flow chart depicting the preferred method of the present application.

Referring to FIG. 12 in the drawings, a flow chart 1201 depicting the preferred method is shown. Box 1203 depicts the first step, which includes providing a chamber similar to chamber 409, wherein a first region 701 is in communication with a second region 703. It should be noted that the first region has a volume larger than the second region, as indicated in box 1203 and shown in at least FIGS. 4-8. Thereafter, an elastomeric material 411 is placed within the chamber, as depicted in box 1205. First and second membranes are utilized to seal the chamber, as depicted in box 1207. Boxes 1209 and 1211 show the final steps, which includes exerting a force on the elastomeric material with a driver subsystem coupled to the first membrane, which in turn creates a displacement that is amplified as the elastomeric material flows from the first portion to the second portion It is apparent that a system and method having significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. A system to amplify displacement motion, the system comprising:
    a housing forming a cylindrical chamber, the chamber having:
        a first end and an opposing second end, each end having a diameter, the first end having a greater diameter than the diameter of the second end; and
        an inner surface;
    a first membrane sealably attached to the inner surface at the first end;
    a second membrane sealably attached to the inner surface at the second end;
    an elastomeric material disposed within the chamber, the elastomeric material filling an entire volume of the chamber; and
    a drive subsystem, having:
        a driver coupled to the first membrane;
    wherein the driver exerts a force on the first membrane, which in turn creates an input displacement;
    wherein the input displacement is amplified as the elastomeric material flows from the first end to the second end, which in turn results in an output displacement at the second end; and
    wherein the output displacement is greater than the input displacement.

2. The system of claim 1, wherein the second membrane is coupled to a working element.

3. The system of claim 2, wherein the working element is an edge flap carried by a rotor blade.

4. The system of claim 2, wherein the working element is a leading edge droop carried by a rotor blade.

5. The system of claim 1, wherein the driver is a piezoelectric motor.

6. An aircraft, comprising:
    a displacement amplifier, having:
        a housing forming a cylindrical chamber, the chamber having:
            a first end and an opposing second end, each end having a diameter, the first end having a greater diameter than the diameter of the second end; and
            an inner surface;
        a first membrane sealably attached to the inner surface at the first end;
        a second membrane sealably attached to the inner surface at the second end;
        an elastomeric material disposed within the chamber, the elastomeric material filling an entire volume of the chamber;
    a drive subsystem, having:
        a driver coupled to the first membrane; and
    a rotor blade, having:
        a working element operably associated with the displacement amplifier;
    wherein the driver exerts a force on the first membrane, which in turn creates an input displacement;
    wherein the input displacement is amplified as the elastomeric material flows from the first end, which in turn results in an output displacement at the second end; and
    wherein the output displacement is greater than the input displacement.

7. The system of claim 6, wherein the driver is a piezoelectric motor.

8. A method to amplify displacement motion, comprising:
    providing a chamber having a first portion in communication with a second portion, the first portion having a larger volume than the volume of the second portion;
    filling the chamber with an elastomeric material having a high bulk modulus;
    fluidly sealing the chamber with a first membrane in communication with the first portion and a second membrane in communication with a the second portion;
    coupling a drive subsystem to the first membrane; and
    exerting a displacement force on the first membrane with the driver subsystem, the displacement force causing the elastomeric material to flow from the first portion to the second portion.

9. The method of claim 8, further comprising:
    tailoring the elastomeric material to have a high modulus of elasticity.

10. The method of claim 8, further comprising:
    tailoring the elastomeric material to provide a desired resonant frequency.

* * * * *